Oct. 19, 1965  J. A. HERRMANN ETAL  3,213,218
VOIDABLE INTERLOCKS FOR PANELBOARD UNITS
Filed Jan. 24, 1962  6 Sheets-Sheet 1

FIG. 1.

INVENTORS
JOHN A. HERRMANN,
DARWIN H. CRALL,
GERALD A. LIVELY.
BY
OSTROLENK, FABER, GERB & SOFFEN
ATTORNEYS.

INVENTORS
JOHN A. HERRMANN,
DARWIN H. CRALL,
GERALD A. LIVELY.

BY OSTROLENK, FABER, GERB & SOFFEN

ATTORNEYS

Oct. 19, 1965    J. A. HERRMANN ETAL    3,213,218
VOIDABLE INTERLOCKS FOR PANELBOARD UNITS
Filed Jan. 24, 1962    6 Sheets-Sheet 6

INVENTORS
JOHN A. HERRMANN,
DARWIN H. CRALL,
GERALD A. LIVELY.
BY
OSTROLENK, FABER, GERB & SOFFEN
ATTORNEYS.

United States Patent Office 3,213,218
Patented Oct. 19, 1965

3,213,218
VOIDABLE INTERLOCKS FOR PANELBOARD UNITS
John A. Herrmann, Grosse Pointe Farms, Darwin H. Crall, Detroit, and Gerald A. Lively, Mount Clemens, Mich., assignors to I-T-E Circuit Breaker Company, Philadelphia, Pa., a corporation of Pennsylvania
Filed Jan. 24, 1962, Ser. No. 168,472
13 Claims. (Cl. 200—50)

Our invention relates to enclosed panelboard units and more particularly to an arrangement whereby a qualified person may open the cover of such a unit without de-energizing its associated circuits and the cover of such an opened energized unit will be prevented from being reclosed unless the operating handle is in the ON position.

In an effort to reduce the size of switchboards and to provide for the simultaneous energization and de-energization of a plurality of circuits a number of circuits are often simultaneously controlled by individual panelboard units. A typical construction well known in the art is to include a pair of contacts for each of the individual circuits within a unitary box. The box contains an external handle which will simultaneously move all the contact pairs into the engaged ON and disengaged OFF positions. The panelboard unit will usually contain an individual circuit protector, such as a fuse, for each of its associated circuits. Should it become necessary to change one of the circuit protectors, or otherwise gain access to the inside of the box, a removable cover is provided. In order to provide for the protection of personnel such covers will normally contain an interlock to prevent the cover from being opened unless the external handle is moved to the OFF position, thereby de-energizing all the associated circuits. Oftentimes these circuits are associated with operating equipment and it is quite undesirable to be forced to shut down all of the associated equipment in order to check a single circuit, or change a single fuse.

In order to permit such access, unit boxes of the prior art provide for a third handle position whereby the cover may be opened without de-energizing the associated circuits. A typical such arrangement is shown in U.S. Patent No. 2,988,612 entitled "Switch Assemblies" to L. A. Hercules issued June 13, 1961. Such an arrangement is however quite dangerous for two reasons: (1) An unauthorized individual attempting to open the box without de-energizing it would quite naturally attempt all permissible handle positions within the ON position play. In so doing, he is most probably apt to stumble across the interlock defeater position; and (2) There is no provision for preventing a cover opened by the interlock defeater from being closed with its handle in the OFF position. Since the contacts will then be in the ON position such a situation would fail to warn subsequent personnel that the circuits associated with that unit box are energized.

The instant invention solves the above noted problems by providing a panelboard unit with an improved interlock and selective door closing arrangement. The interlock will prevent the cover from being opened while the handle is in the ON position by restraining the movement of the handle operating lever. A spring biased defeater member performs this function and thereby serves to keep the interlock members in engagement. In order to disengage the interlock member and open the cover it is necessary to gain access to the spring biased defeater. A slot is provided in the external surface of the cover through which a tool, such as a screwdriver, may be inserted to move the defeater. Thus, in order to defeat the interlock it is necessary to insert a tool in the defeater slot. The slot is preferably so positioned and blended into its surroundings so as not to make its function particularly obvious. To further make the defeater of the instant invention inobvious an additional requirement of also turning the handle beyond its normal operating positions is present in one of the embodiments and both embodiments require the simultaneous release of a tab. Consequently, only those personnel familiar with the defeater's operation will be able to open an energized panelboard unit. Once the cover is opened by the defeater, it is necessary to prevent the cover from closing when the handle position does not correspond to the contact ON position. This is achieved in the instant invention by an abutting member operatively connected to the movable contacts. When the contacts are in their ON position this member is so disposed that it will strike a projecting member of the handle operating lever should an attempt be made to close the cover while the handle is in the OFF position. The striking of these two members absolutely prevents the cover from being closed.

The basic principles of our invention may be shown in a variety of forms, depending upon the particular configuration of the panelboard unit. For illustrative purposes we have chosen two preferred embodiments. Although both of these embodiments differ somewhat in their actual construction of cooperating parts, they both embody the same general concepts outlined above.

In the first embodiment the spring biased interlock defeater member is mounted to the underside of the cover and is operatively engaged with the handle operating lever to limit the lever's rotative motion in the ON position. The side of the unit housing has a rigid bracket attached to its inner surface and jutting out from that surface. When the cover is closed and the unit is in the ON position a portion of the handle operating lever is positioned under the housing bracket, and maintained under the bracket by having its rotative motion limited. In this position the abutment of the operating lever and the housing bracket will prevent the cover from being opened. To open the cover in this position a tool is inserted in a defeater slot provided in the cover and the spring loaded defeater member is depressed. This will permit the operating lever to extend its rotative motion sufficiently to clear the defeater member and be moved to a position beyond the abutting housing bracket. In this position the operating lever is clear of the housing bracket and is free to open.

To close the unit it is merely necessary to close the cover with the handle in the defeater position and rotate it back to the ON position. To insure the handle being maintained in that position while the cover is opened this embodiment includes a means to restrain the motion of the handle to the defeater position. This is achieved by the coaction of the spring loaded defeater member and a formation in the operating lever. However, should the handle be rotated to the OFF position in the interim a forwardly projecting portion of the operating lever will strike an abutting member of the contact operating mechanism, thereby preventing the cover from being closed.

In the second embodiment we show two adjacent and similar sub-units within a single panelboard unit. However, the operating mechanism of this embodiment may be equally well adapted to a single panelboard unit. A spring biased interlock defeater member and defeater slot is contained within a central bar of the unit housing. When the switch is in the ON position a spring biased abutment is interposed between the operating lever and cover, thereby preventing the cover from being opened. The spring biased abutment is pivotally attached to the defeater member in such a manner that the depression of the defeater member by a tool inserted in the defeater slot will effect movement of the interlock abutment from its interposed position. The selective door closing mechanism of this embodiment is basically similar to that of the other embodiment. Therefore, in our invention we: (1) Provide a defeater means for an authorized person to open the interlocked cover of a panelboard unit while the contacts are in the ON position; (2) prevent shutdown of many circuits because of inspection or minor adjustment of the unit; (3) enable qualified personnel to open the interlocked cover with a simple tool; (4) prevent closing a cover with its handle in the OFF position and the switch is in the ON position; (5) make the defeater means inobvious to unauthorize personnel.

Accordingly, a primary object of the instant invention is to provide a novel means to prevent the opening of an energized panelboard unit through inadvertance or lack of understanding on the part of the person making its replacement, while permitting such opening to be readily accomplished by a properly authorized person.

Another object is to provide a novel means to prevent the opened door of an energized panelboard unit to be closed while its handle is in the OFF position.

Still another object is to provide an improved mechanism to integrally relate the functions of the above two objects.

A further object is to provide a novel means to prevent an unauthorized person from opening an energized panelboard unit, while permitting an authorized person to open such a unit by consecutively or simultaneously performing a number of functions.

A still further object is to provide for a novel arrangement of an interlock abutment and operating rod interlock projection for preventing an unauthorized person from opening an energized panelboard unit while providing an externally accessible spring biased interlock defeater to permit an authorized person to readily open such a unit.

Still another object is to provide a novel interlock and defeater arrangement whereby a panelboard unit is maintained closed in the ON position by a spring biased member preventing arcuate motion of the operating lever, and a defeater slot is provided in the unit cover for the reception of a tool to depress the spring biased member and permit extended arcuate movement of the operating lever.

Yet another object is to provide a novel interlock and defeater arrangement whereby a panelboard unit is maintained closed in the ON position by a spring biased abutment in the housing which engages the operating lever, and a defeater slot is provided in the unit for the reception of a tool to effect disengagement of the abutment and the operating lever.

These as well as other objects of the instant invention shall readily become apparent after reading the following description of the accompanying drawings in which.

Referring to FIGURES 1–6 which illustrate the first embodiment of the instant invention, the panelboard unit 10 comprises a case 11 having a cover 12 pivotally mounted at hinges 13. Case 11 contains side portions 14 and 15 and end portions 16 and 17. Tab 18 resiliently secured to case 11 at end 16 mates with cover opening 19 to prevent the cover 12 from accidently flying open. A number of stationary contacts 20 are disposed within the case 11. Each of these contacts 20 are positioned to mate with a movable contact 21, which may be of the type described in U.S. Patent No. 2,820,123 entitled "Molded Switch Head" issued in the names of L. W. Higgens et al. and assigned to the assignee of the instant invention. The movable contacts 21 are all mounted to bail 22. Bail 22 contains right angle bends at its outer extensions to form end projections 23 and 24. End 23 is pivotally mounted to side 14 by pin 25. Pin 26 extends through end 24 and cam operator 28 of contact operating mechanism 27 to pivotally mount these members to side 15 of case 11. Rotative motion of cam operator 28 about pin 26 will result in an up and down movement of bail 22. This movement of bail 22 will disengage and engage the individual contact pairs 20–21, respectively, and corresponds to the OFF and ON positions of those contacts. Cam operator 28 has a bracket 29 securably attached to it by pins 30 and 31 to form a slot for the reception of handle operating lever projection 50. As will be set forth below, the projection 50 will bear against pins 30 or 31 while the external handle is rotated to cause rotation of cam operator 28. Cam operator has two normal positions, corresponding to the contact ON and OFF positions. It is spring biased into these positions by the coaction of spring retainer 32, spring 34, and spring slot angle 35. Spring retainer 32 is pivotally mounted to cam operator by pin 33. Bracket extension 36 of cam operator 28 has an opening 37 in which bail end 24 is contained. Bracket extension 36, in cooperation with the other members of contact operating mechanism 27 will transmit a loss-motion rapid switching movement to bail 22. Bracket 38 mounted to case side 14 serves as a limit stop for bail 22 in its ON and OFF position. Cam operator 28 also has an extension or selective door closing abutment 39, the purpose of which will be more fully set forth below.

Cover 12 has a handle 40 mounted to its outer surface and a handle operating mechanism 41 mounted to its inner surface. Handle 40 may be rotatively positioned to an ON and an OFF position. This rotary motion is translated to handle operating lever 42 via interconnecting lever 43. Handle operating lever 42 and interconnecting lever 43 are pivotally attached to cover 12 by pins 60 and 61, respectively. Interconnecting lever 43 is attached to handle 40 by screws 44 and 45 which pass through arcuate cover openings 46 and 47, respectively. Pin 48 is secured to the end of interconnecting lever 43 and is journaled in elongated slot 49 of operating lever 42. Thus, the rotary motion of handle 40 is transmitted to operating lever 42, with the striking of screws 44 or 45 against the ends of arcuate openings 46 or 47 limiting the ultimate extent of the rotary movement.

Figure 1:
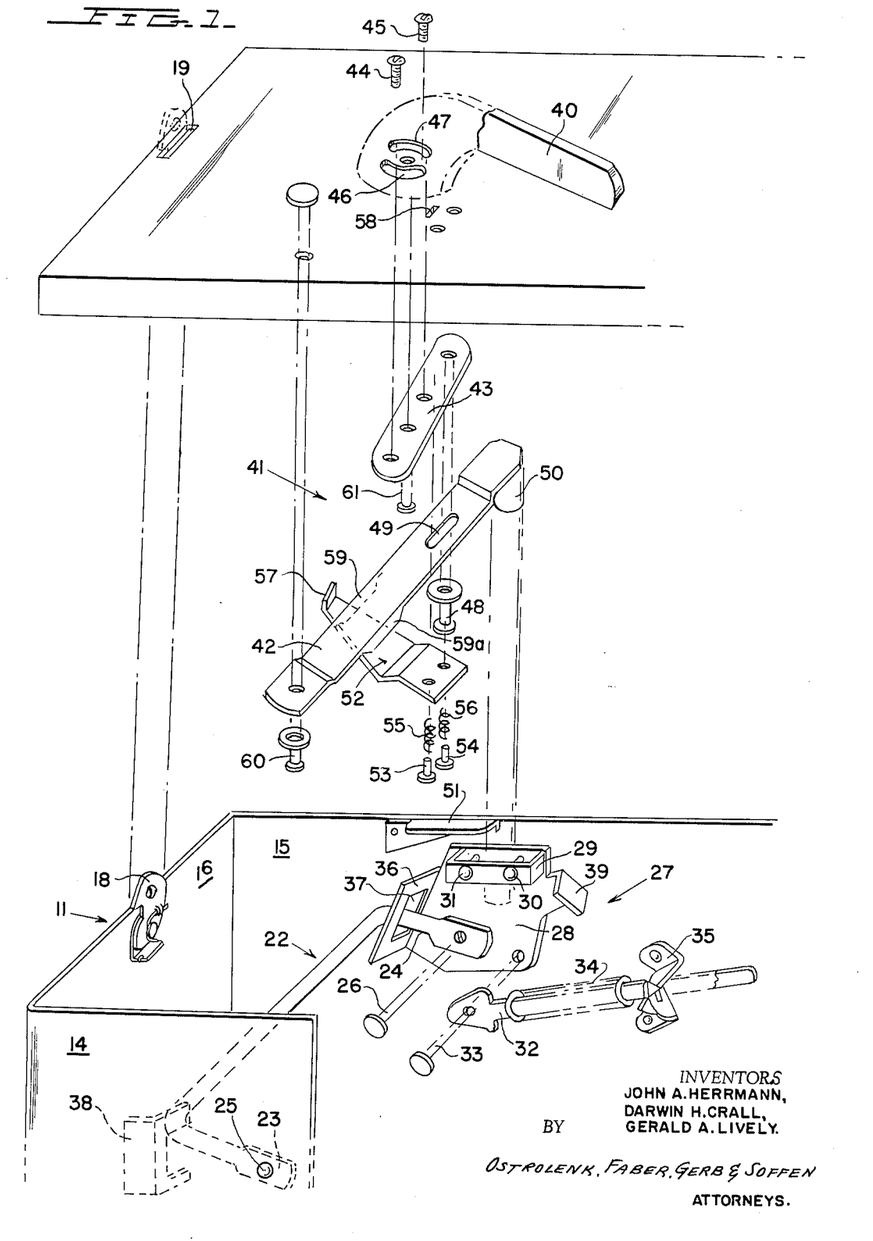
FIGURE 1 is an exploded view of a first embodiment of the instant invention shown in the OFF position.
Figure 2:
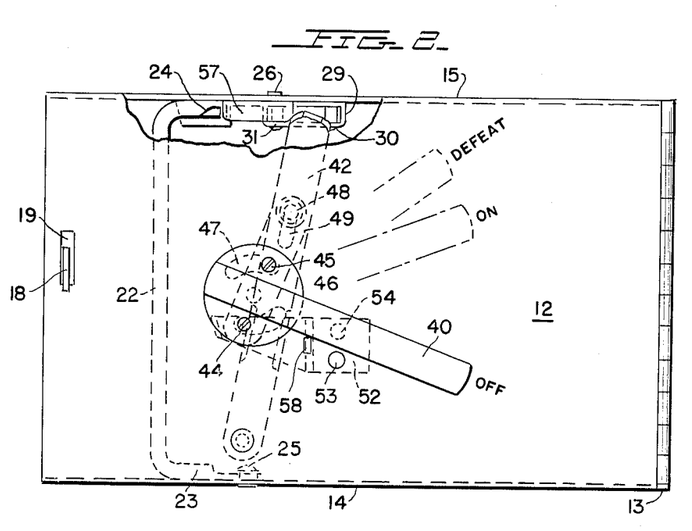
FIGURE 2 is a plan view of the embodiment of FIGURE 1 with the cover closed and the operating mechanism shown in the OFF position.
Figure 3:
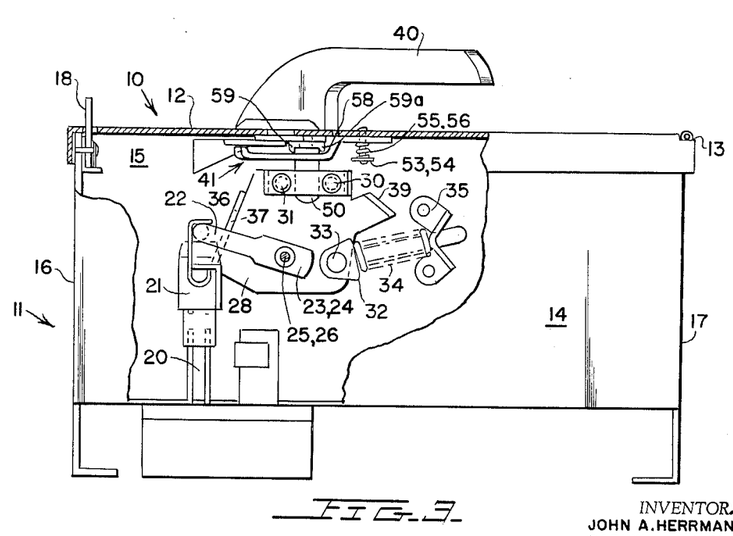
FIGURE 3 is a partial cut-away side elevation of FIGURE 2.
Figures 4, 4A:
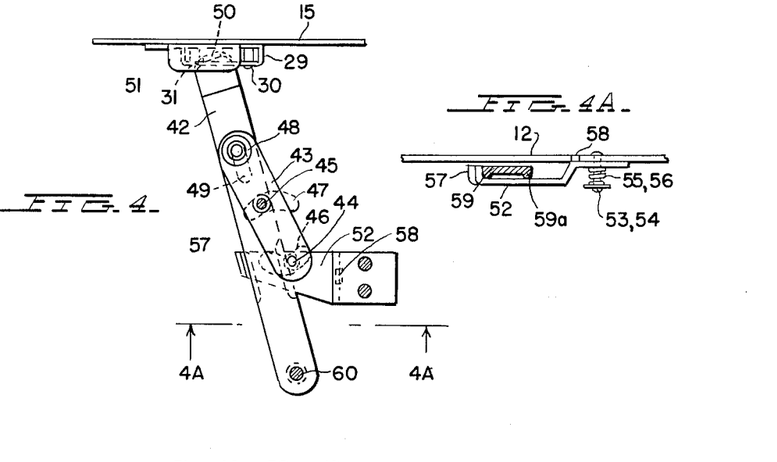
FIGURES 4 and 4a are a plan and side elevation respectively of the interlock mechanism of FIGURES 1–3 shown in the ON position.
Figure 5:
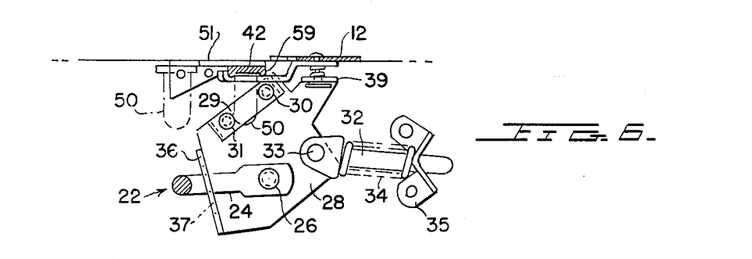
FIGURES 5 and 5a are a plan and side elevation respectively of the same mechanism in the DEFEAT position.
Figures 5A, 6:
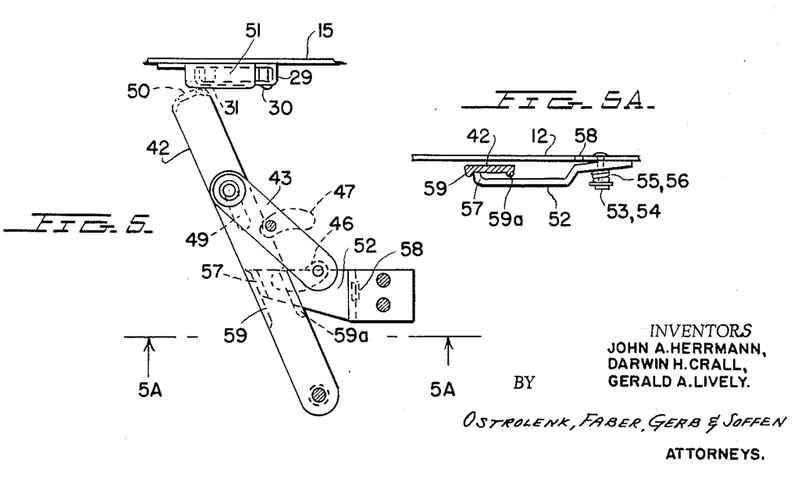
FIGURE 6 is a side elevation of the contact operating mechanism of FIGURES 1–3 shown in the ON position.
Figure 7:
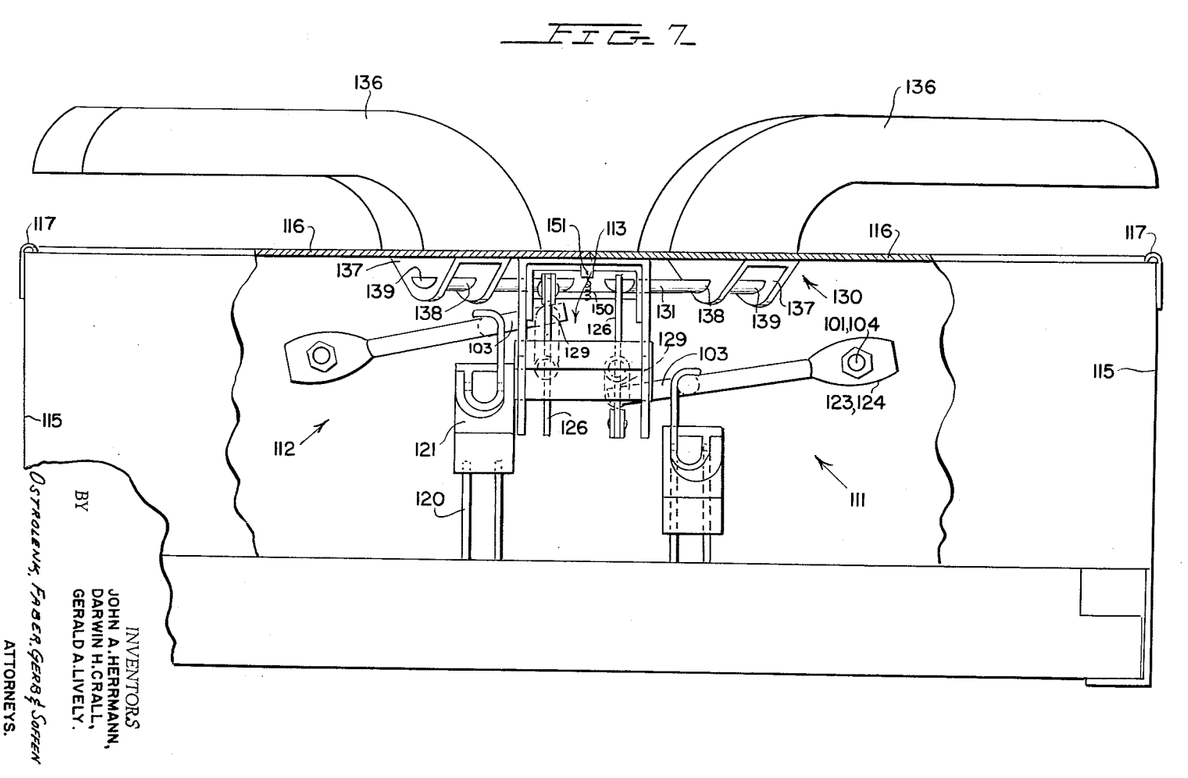
FIGURE 7 is a cut away side elevation of a second embodiment of the instant invention, with its right hand sub-unit shown in the ON position and its left hand sub-unit shown in the OFF position.
Figure 8:
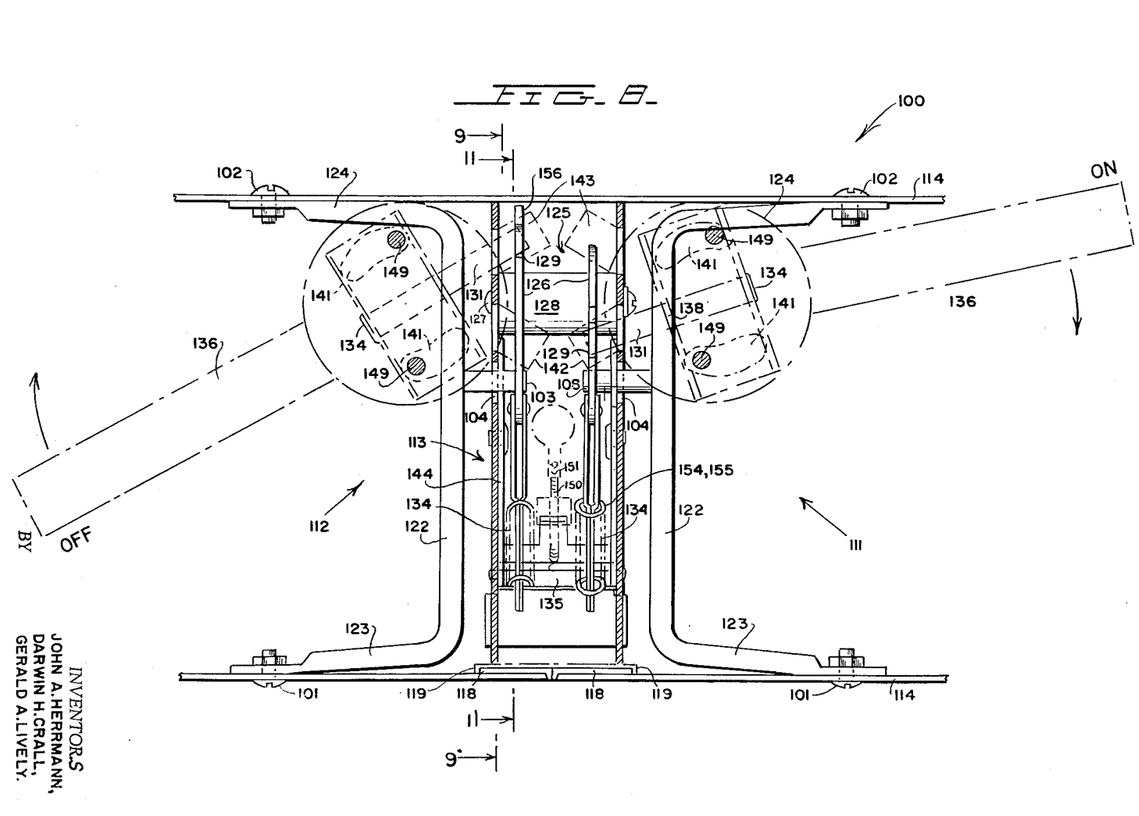
FIGURE 8 is a plan view of the embodiment of FIGURE 7 with the cover partially in phantom.
Figure 9:
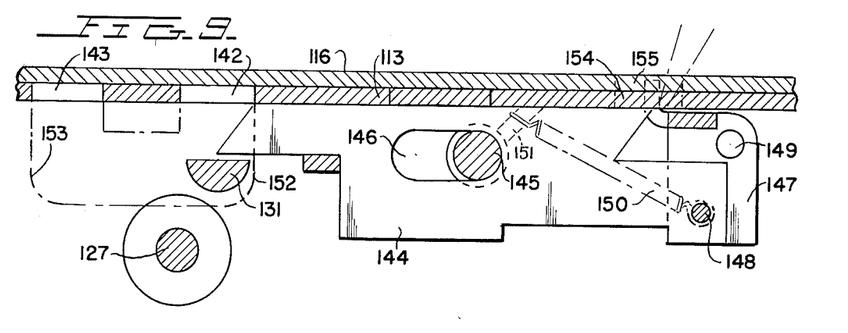
FIGURE 9 is a cross section taken through line 9—9 of FIGURE 8, looking in the direction of the arrows.

Handle operating lever 42 has a selective door closing projection 50 which will engage the slot provided by bracket 29 and pins 30, 31 of contact operating mechanism 27 when the cover is closed. Clockwise rotation of handle 40 will cause projection 50 to bear against pin 30, rotating cam operator 28 clockwise so as to switch contact pairs 20–21 to the OFF position, as shown in FIGURES 1, 2 and 3. Counterclockwise rotation of handle 40 will cause projection 50 to bear against pin 31, rotating cam operator 28 counterclockwise so as to switch contact pairs 20–21 to the ON position, as shown in FIGURES 4 and 6.

In the ON position the forward portion of operating lever 42 is disposed below a door interlock abutment or interlock bracket 51, which is rigidly secured to side 15 of case 11. The interposition of interlock abutment or bracket 51 between operating lever 42 and cover 12 will prevent the cover from being opened. To prevent the opening of cover 12 while the unit is in the ON position the arcuate movement of operating lever 42 is limited to within the extremities of interlock bracket 51. Pin 30 strikes projection 50 to so limit the clockwise movement of operating lever 42. An interlock defeater bracket 52 strikes operating lever 42 to so limit its counterclockwise movement. Defeater bracket 52 is resiliently mounted to the underside of cover 12 by rivets 53 and 54 containing springs 55 and 56, respectively. A hooked end 57 of defeater bracket 52 bears against operating lever 42 to effect the aforementioned limitation of counterclockwise movement. Interlock defeater bracket is externally accessible via a slot 58 in cover 12. The insertion of a tool, such as a screwdriver, in slot 58 and the depressing of spring biased defeater member 52 therewith will permit operating lever 42 to clear hook end 57. Operating lever 42 is then free to rotate counterclockwise a sufficient amount to clear interlock bracket 51, as shown in FIGURE 5. In this DEFEAT position cover 12 is now free to open while contacts 20–21 are in the ON position. Note that after the defeater 52 is depressed the handle 40 must be rotated to a new position and tab 18 must be released to open the cover. To maintain the operating lever in the DEFEAT position while the cover is opened the rotative motion of operating lever 42 is limited. Lip 59 of operating lever 42 will bear against hook end 57 of subsequently released interlock defeater 52 to limit the clockwise movement. Screw 44 bears against the end of arcuate opening 46 to limit the counterclockwise movement. Panelboard units are often mounted in pairs with the handles rotating in respectively opposite directions. In order to effect manufacturing savings the parts of such units are preferably interchangeable. Accordingly operating lever 42 has a lip 59a at its other side which will serve the purpose of lip 59 in the matched pair of panelboard unit 10.

To return the panelboard unit 10 to its normal positions, it is merely necessary to close the cover 12 and rotate the handle 40 to its ON or OFF position. Should the handle 40 have been rotated to its OFF position prior to the closing of the cover 12 it is imperative that it be impossible to close the cover and give an erroneous indication of circuit de-energization. This desirable safety function is performed by the coaction of selective door closing abutment 39 and operating lever projection 50. The counterclockwise rotation of cam operator 28, (which places the contact pairs 20–21 in the ON position) places extension 39 adjacent and parallel to the top edge of side 15. In that position it is disposed in the path of operating lever projection 50 when handle 40 is in the OFF position, thereby preventing the cover 12 from being closed. As a slight variation of the embodiment illustrated, extension 39 may be a separate part pivotally mounted to cam operator 28 and journaled to a pin mounted to side 15. This variation would be desirable where it is necessary to have a longer abutting surface or extension 39.

In the OFF position (FIGURES 2 and 3), the forward portion of operating lever 42 is clear of interlock bracket 51. Thus, cover 12 is free to open with the contacts 20–21 in the OFF positions. To preserve the sequence of operation, the rotative motion of operating lever 42 in the OFF position is limited by projection 50 bearing against pins 30, 31 or screws 44, 45 bearing against the ends of arcuate openings 46, 47. It is also seen that in the OFF position the location of cam operator extension 39 is changed to remove it from the path of operating lever projector 50. Should an attempt be made to close cover 12 with its handle 40 in the ON position, projection 50 will strike bracket 51 thereby preventing the cover from being closed in the ON position while the contact pairs 20–21 are in the OFF position.

Referring now to FIGURES 7–11, there is shown a second embodiment of my invention. Panelboard unit 100 comprises two sub-units 111 and 112 separated by central bar 113. The sub units each have sides 114, ends 115, and a cover 116 pivotally mounted at hinge 117. Tabs 118 and cover openings 119 correspond to analogous parts 18 and 19 of the aforementioned embodiment. Likewise, stationary contacts 120, movable contacts 121, bail bars 122 and end projection 123, 124 thereof correspond to parts 20–24 respectively of the previously discussed embodiment. Ends 123 and 124 are pivotally mounted to sides 114 by pins 101 and 102. Bail 122 has an extending rod 103 attached thereto which enters an elongated opening 104 in central bar 113 and engages cam operator 126 of contact operating mechanism 125. Cam operator 126 is pivotally mounted to central bar 113 by pin 127. A cylindrical separator 128 is contained at the center of pin 127 to maintain the spacing of the respective cam operators 125. Rotative motion of each cam operator 126 about pin 127 will result in an up and down movement of its associated bail 122. This will effect the switching of its contact pairs 120–121 to the OFF and ON positions, respectively. Opening 129 in cam operator 126 receives operating lever 131 of handle operating mechanism 130. The function of members 129 and 131 is to switch the contact positions in a manner analogous to that of bracket 29 and operating lever forward projection 50 of the embodiment previously discussed. Likewise, spring retainer 132, pin 133, spring 134 and spring shot angle 135 correspond to parts 32–35 respectively of the aforementioned embodiment.

Cover 116 has a handle 136 mounted to its outer surface and may be rotatively positioned between an ON and OFF position. This rotary motion is directly translated to operating lever 131 via bracket 137. Operating lever 131 is rigidly secured to bracket 137 by its insertion in opening 138 and 139 thereof. Handle 136 is attached to bracket 137 by screws 149 which pass through arcuate cover openings 141. The striking of screws 149 against the ends of arcuate openings 141 limits the ultimate extent of handle 136's rotary movement.

Central bar 113 has operating lever engaging opening 142 and 143, corresponding to the ON and OFF position respectively. When a particular sub-unit is in the ON position (as shown by sub-unit 111 of the figures) operating lever 131 will be in slot 142. Interlock abutment member 144 is interposed between operating lever 131 and cover 116, thereby preventing the cover from being opened.

Interlock abutment member 144 is journaled to central bar 113 by pin 145 movable in elongated slot 146 of member 144. Abutment member 144 is pivotally mounted to bracket 147 by common pin 148. Bracket 147 is pivotally mounted to central bar 113 by pin 149. A spring 150 is connected between pin 148 and central bar tongue 151. In this manner spring 150 will bias bracket 147 and abutment member 144 into the position shown in FIGURE 9.

Figure 10:
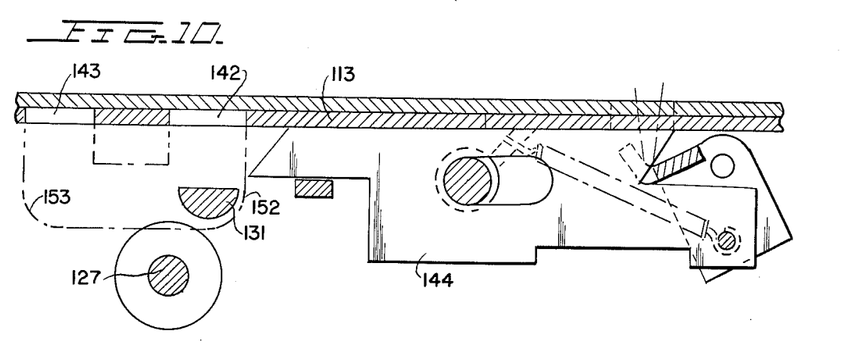
FIGURE 10 is the mechanism of FIGURE 9 shown in the DEFEAT position.

The surface of operating lever 131 which strikes interlock member 144 is preferably flat to secure the abutting relationship. To maintain this relationship between members 131 and 144 in the ON position, so as to prevent the door from being opened, the arcuate movement of operating lever 131 is restrained. Edge 152 of opening 142 limits counterclockwise rotation. Edge 153 of cam operator 126 limits clockwise rotation. To open the door while the unit is in this position an externally accessible defeater slot 154 in central bar 113 provides access to spring biased bracket 147. This slot is accessible via slits 155 in the cover 116. As shown in FIGURE 10 the insertion of a screwdriver in slot 154 and the depressing of spring biased bracket 147 will cause it to pivot about pin 149. This motion will be translated to interlock abutment member 144 to cause it to withdraw from its interposed position. In this DEFEAT position either cover 116 is now free to open while its associated contact pairs 120–121 are in the ON position. Note however that spring biased bracket 147 must be depressed simultaneously with the releasing tab 118 to open the cover 116.

To return the panelboard unit to its normal position the cover is closed with its handle 136 in the ON position. The underside of the operating lever 131 will now strike the upper surface of interlock member 144. The underside of operating lever 131 is preferably rounded and the upper surface of member 144 is preferably beveled so that the member 144 may be urged against its spring bias. In this manner, abutment 144 will be withdrawn from opening 142 permitting the operating lever 131 to return to its position below that member. Cover 116 is prevented from being closed with handle 136 in the OFF position by formation or selective door closing abutment 156 of cam operator 126 which blocks opening 143 when the cam operator is rotated to bring the contact pairs to the ON position. In this position it is disposed in the path of the forward portion of operating lever 131 when handle 136 is in the OFF position, thereby preventing the cover 116 from being closed.

Figure 11:
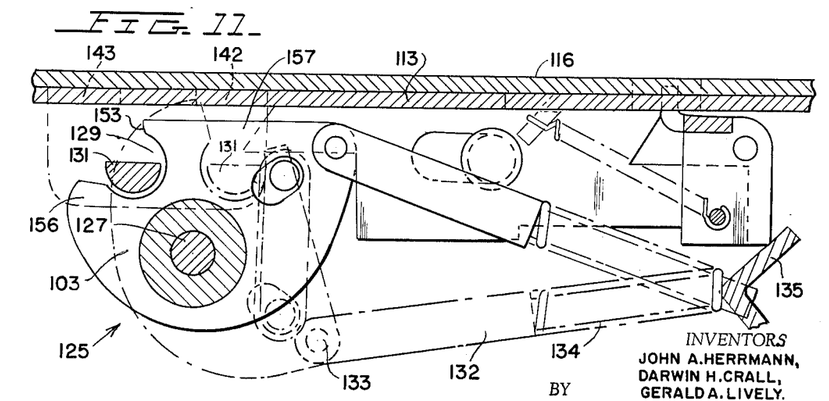
FIGURE 11 is a cross section taken through line 11—11 of FIGURE 8 looking in the direction of the arrows.

In the OFF position (as shown by sub-unit 112) the operating lever 131 is in opening 143 and is free of interlock abutment 144. Thus, cover 116 is free to open with the contact pairs 120–121 in the OFF position. It is also seen that in the OFF position, the location of cam operator formation 156 is changed to remove it from the path of operating lever 131. Also, in the OFF position cam operator formation 157 blocks opening 142 (as best shown in FIGURE 11) to prevent the cover from being closed with its handle 136 in the ON position.

Although we have here described preferred embodiments of our novel invention, many variations and modifications will now be apparent to those skilled in the art, and we therefore prefer to be limited, not by the specific disclosure herein, but only by the appended claims.

We claim:

1. A panelboard unit comprising a box having a housing and a removable cover thereof, said cover having an outer surface and an inner surface, means mounting a handle to said outer surface, means mounting a handle operating mechanism to said inner surface, means rotatably positioning said operating mechanism responsive to movement of said handle to an ON position and an OFF position, said housing containing a plurality of electrical contact pairs, a contact operating mechanism and a door interlock abutment, said contact pairs having an ON and OFF position, means connecting said contact operating mechanism to said contact pairs for switching said contact pairs to said positions; means connecting said contact operating mechanism to said handle operating mechanism whereby movement of said handle to its ON or OFF position will effect corresponding movement between said contact ON and OFF positions, said handle operating mechanism containing a forward portion, said interlock abutment being located between said forward portion and said cover when said contacts and handle are in the ON position, said forward portion being located in engagement below said interlock abutment whereby said cover is prevented from being removed, a door opening defeater system externally accessible via a defeater slot, said defeater slot being shaped to receive a tool for releasing the engagement of said door interlock abutment and said forward portion while said contacts are in the ON position, a selective door closing means comprising a selective door closing abutment; means connecting said selective door closing abutment to said contact operating mechanism, and a selective door closing projection; means connecting said selective door closing projection to said handle operating mechanism, said selective door closing abutment having a first position and a second position corresponding to said contact pairs ON and OFF positions respectively, said selective door closing projection moving between a first position and a second position corresponding to said handle ON and OFF position respectively, said selective abutment in its first position blocking the movement of said selective projection from its first to its second position, thereby preventing said cover from being closed while said contact pairs are in the ON position and said handle in the OFF position.

2. A panelboard unit comprising a box having a housing and a removable cover thereof, said cover having an outer surface and an inner surface, means mounting a handle to said outer surface, means mounting a handle operating mechanism to said inner surface, said handle operating mechanism containing a rigid integrally formed operating lever, means rotatably positioning said operating mechanism responsive to movement of said handle to an ON position and an OFF position, said housing containing a plurality of electrical contact pairs, a contact operating mechanism and a door interlock abutment, said contact pairs having an ON and OFF position, means connecting said contact operating mechanism to said contact pairs for switching said contact pairs to said positions, means connecting said contact operating mechanism to said operating lever whereby movement of said handle to its ON or OFF position will effect corresponding movement between said contact ON and OFF positions, said operating lever containing a forward portion, said interlock abutment being located between said forward portion and said cover when said contacts and handle are in the ON position, said forward portion being located in engagement below said interlock abutment whereby said cover is prevented from being removed, a door opening defeater system externally accessible via a defeater slot, said defeater slot being shaped to receive a tool for releasing the engagement of said door interlock abutment and said forward portion while said contacts are in the ON position, a selective door closing means comprising a selective door closing abutment; means connecting said selective door closing abutment to said contact operating mechanism, and a selective door closing projection extending from said operating lever, said selective door closing projection movable between a first position and a second position corresponding to said handle ON and OFF position respectively, said selective door closing abutment having a first position and a second position corresponding to said handle ON and OFF position respectively, said selective abutment in its first position blocking the movement of said selective projection from its first to its second position, thereby preventing said cover from being closed while said contact pairs are in the ON position and said handle is in the OFF position.

3. A panelboard unit comprising a box having a housing and a removable cover thereof, said cover having an outer surface and an inner surface, means mounting a handle to said outer surface, means mounting a handle operating mechanism to said inner surface, means rotatably positioning said operating mechanism responsive to movement of said handle to an ON position and an OFF position, said housing containing a plurality of electrical contact pairs, a contact operating mechanism and a door interlock abutment, said contact pairs having an ON and OFF position, means connecting said contact operating mechanism to said contact pairs for switching said contact pairs to said positions; means connecting contact operating mechanism to said handle operating mechanism whereby movement of said handle to its ON or OFF position will effect corresponding movement between said contact ON and OFF positions, said handle operating mechanism containing a forward portion, said interlock abutment being located between said forward portion and said cover when said contacts and handle are in the ON position, said forward portion being located in engagement below said interlock abutment whereby said cover is prevented from being removed, a spring biased door opening defeater system externally accessible via a defeater slot, said defeater slot being shaped to receive a tool for releasing the engagement of said door interlock abutment and said forward portion while said contacts are in the ON position, a selective door closing means comprising a selective door closing abutment; means connecting said selective door closing abutment to said contact operating mechansim, and a selective door closing projection; means connecting said door closing projection to said handle operating mechanism, said selective door closing abutment having a first position and a second position corresponding to said contact pairs ON and OFF position respectively, said selective door closing projection movable between a first position and a second position corresponding to said handle ON and OFF position respectively, said selective abutment in its first position blocking the movement of said selective projection from its first to its second position, thereby preventing said cover from being closed while said contact pairs are in the ON position and said handle is in the OFF position.

4. A panelboard unit comprising a box having a housing and a removable cover thereof, said cover having an outer surface and an inner surface, means mounting a handle to said outer surface, means mounting a handle operating mechanism to said inner surface, said handle operating mechanism containing a rigid integrally formed operating lever, means rotatably positioning said operating mechanism responsive to movement of said handle to an ON position and an OFF position, said housing containing a plurality of electrical contact pairs, a contact operating mechanism and a door interlock abutment, said contact pairs having an ON and OFF position, means connecting said contact operating mechanism to said contact pairs for switching said contact pairs to said positions, means connecting said contact operating mechanism to said operating lever whereby movement of said handle to its ON or OFF position will effect corresponding movement between said contact ON and OFF positions, said operating lever having a forward portion, said interlock abutment being located between said forward portion and said cover when said contacts and handle are in the ON position, said forward portion being located in engagement below said interlock abutment whereby said cover is prevented from being removed, a door opening defeater system externally accessible via a defeater slot, said defeater slot being shaped to receive a tool for releasing the engagement of said door interlock abutment and said forward portion while said contacts are in the ON position, said defeater system comprising a spring biased member for restricting the movement of said operating lever so as to maintain the engagement of said interlock abutment and said forward portion, said spring biased member engaging said inserted tool, for movement thereof in a direction to disengage said operating lever upon the insertion of said tool in said defeater slot, a selective door closing means comprising a selective door closing abutment; means connecting said selective door closing abutment to said contact operating mechanism, and a selective door closing projection extending from said operating lever, said selective door closing abutment having a first position and a second position corresponding to said contact pairs ON and OFF position respectively, said selective door closing projection movable between a first position and a second position corresponding to said handle ON and OFF position respectively, said selective abutment in its first position blocking the movement of said selective projection from its first to its second position, thereby preventing said cover from being closed while said contact pairs are in the ON position and said handle is in the OFF position.

5. A panelboard unit comprising a box having a housing and a removable cover thereof, said cover having an outer surface and an inner surface, means mounting a handle to said outer surface, means mounting a handle operating mechanism to said inner surface, said handle operating mechanism containing a rigid integrally formed operating lever, means rotatably positioning said operating mechanism responsive to movement of said handle to an ON position and an OFF position, said handle operating mechanism containing means to limit the extent of the rotatable positioning of said operating lever to within a predetermined arcuate path length, said housing containing a plurality of electrical contact pairs, a contact operating mechanism and a door interlock abutment, said contact pairs having an ON and OFF position, means connecting said contact operating mechanism to said contact pairs for switching said contact pairs to said positions, means connecting said contact operating mechanism to said operating lever whereby movement of said handle to its ON or OFF position will effect corresponding movement between said contact ON and OFF positions, said operating lever having a forward portion, said interlock abutment being located between said forward portion and said cover when said contacts and handle are in the ON position, said forward portion being located in engagement below said interlock abutment whereby said cover is prevented from being removed, a door opening defeater system externally accessible via a defeater slot, said defeater slot being shaped to receive a tool for releasing the engagement of said door interlock abutment and said forward portion while said contacts are in the ON position, said defeater system comprising a spring biased member for restricting the movement of said operating lever so as to maintain the engagement of said interlock abutment and said forward portion, said spring biased member engaging said inserted tool for movement thereof in a direction to disengage said operating lever upon the insertion of said tool in said defeater slot, a selective door closing means comprising a selective door closing abutment; means connecting said selective door closing abutment to said contact operating mechanism, and a selective door closing projection extending from said operating lever, said selective door closing abutment having a first position and a second position corresponding to said contact pairs ON and OFF position respectively, said selective door closing projection moving between a first position and a second position corresponding to said handle ON and OFF position blocking the movement of said projection from its first to its second position, thereby preventing said cover from being closed while said contact pairs are in the ON position and said handle is in the OFF position.

6. A panelboard unit comprising a box having a housing and a removable cover thereof, said cover having an outer surface and an inner surface, means mounting a handle to said outer surface, means mounting a handle operating mechanism to said inner surface, said handle operating mechanism containing a rigid integrally formed operating lever and a spring biased interlock defeater member, means connecting said operating lever to said handle to rotatably position said operating lever responsive to being rotated to an ON and an OFF position, said handle operating mechanism containing means including said interlock defeater member to limit the extent of the rotatable motion of said operating lever to within a predetermined arcuate path length, said housing containing a plurality of electrical contact pairs, a contact operating mechanism and a stationary, rigid, door interlock abutment, said contact pairs having an ON and an OFF position, means connecting said contact operating mechanism to said contact pairs for switching said contact pairs to said positions, means connecting said contact operating mechanism to said operating lever whereby movement of said handle to its ON or OFF position will effect corresponding movement between said contact ON and OFF position, said operating lever containing a forward portion, said interlock abutment being located between said forward portion and said cover when said contacts are in the ON position, said forward portion being maintained below said interlock abutment by said means to limit the extent of rotatable motion of said operating lever, said last mentioned means including said interlock defeater member, said interlock defeater member being externally accessible via a defeater slot in said cover, said interlock defeater member being movable to allow extended arcuate movement of said operating lever upon the insertion of a tool in said slot, said extended arcuate movement being of a sufficient extent to disengage the interposed relationship of said forward portion and said interlock abutment, a selective door closing means comprising a selective door closing abutment; means connecting said selective door closing abutment to said contact operating mechanism, and a selective door closing projection extending from said operating lever, said selective door closing abutment having a first position and a second position corresponding to said contact pairs ON and OFF position, respectively, said selective door closing projection movable between a first position and a second position corresponding to said handle ON and OFF position respective said selective abutment in its first position blocking the movement of said selective projection from its first to its second position, thereby preventing said cover from being closed while said contact pairs are in the ON position and said handle is in the OFF position.

7. A panelboard unit comprising a box having a housing and a removable cover thereof, said cover having an outer surface and an inner surface, means mounting a handle to said outer surface, means mounting a handle operating mechanism to said inner surface, said handle operating mechanism containing a rigid integrally formed operating lever and a spring biased interlock defeater member, means connecting said operating lever to said handle to rotatably position said operating lever responsive to said handle being rotated to an ON and an OFF position, said handle operating mechanism containing means including said interlock defeater member and first and second pin means to limit the extent of the rotatable motion of said operating lever to within a predetermined arcuate path length between said ON and OFF positions, said housing containing a plurality of electrical contact pairs, a contact operating mechanism and a stationary, rigid door interlock abutment, said contact pairs having an ON and an OFF position, means connecting said contact operating mechanism to said contact pairs for switching said contact pairs to said positions, means connecting said contact operating mechanism to said operating lever whereby movement of said handle to its ON or OFF position will effect corresponding movement between said contact ON and OFF position, said operating lever containing a forward portion, said interlock abutment being located between said forward portion and said cover when said contacts are in the ON position, said forward portion being maintained below said interlock abutment by said means to limit the extent of the rotatable motion of said operating lever, said last mentioned means including said interlock defeater member and one of said first and second pin means, said interlock defeater member being externally accessible via a defeater slot in said cover, said interlock defeater member being moved to allow extended arcuate movement of said operating lever upon the insertion of a tool in said slot, said extended arcuate movement being of a sufficient extent to disengage the interposed relationship of said forward portion and said interlock abutment, a selective door closing means comprising a selective door closing abutment; means connecting said selective door closing abutment to said contact operating mechanism, and a selective door closing projection extending from said operating lever, said selective door closing abutment having a first position and a second position corresponding to said contact pairs ON and OFF position respectively, said selective door closing projection movable between a first position and a second position corresponding to said handle ON and OFF position respectively, said selective abutment in its first position blocking the movement of said selective projection from its first to its second position, thereby preventing said cover from being closed while said contact pairs are in the ON position and said handle is in the OFF position.

8. A panelboard unit comprising a box having a housing and a removable cover thereof, said cover having an outer surface and an inner surface, means mounting a handle to said outer surface, means mounting a handle operating mechanism to said inner surface, said handle operating mechanism containing a rigid integrally formed operating lever and a spring biased interlock defeater member, means connecting said operating lever to said handle to rotatably position said operating lever responsive to said handle being rotated to an ON and an OFF position, said handle operating mechanism containing means including said interlock defeater member and first and second pin means to limit the extent of the rotatable motion of said operating lever to within a predetermined arcuate path length between said ON and OFF positions, said housing containing a plurality of electrical contact pairs, a contact operating mechanism and a stationary, rigid, door interlock abutment, said contact pairs having an ON and an OFF position, means connecting said contact operating mechanism to said contact pairs for switching said contact pairs to said positions, means connecting said contact operating mechanism to said operating lever whereby movement of said handle to its ON or OFF position will effect corresponding movement between said contact ON and OFF position, said operating lever containing a forward portion, said interlock abutment being located between said forward portion and said cover when said contacts are in the ON position, said forward portion being maintained below said interlock abutment by said means to limit the extent of the rotatable motion of said operating lever, said last mentioned means including said interlock defeater member and one of said first and second pin means, said interlock defeater member being externally accessible via a defeater slot in said cover, said interlock defeater member being movable to allow extended arcuate movement of said operating lever upon the insertion of a tool in said slot, said extended arcuate movement being in a direction opposite the movement to said ON position and sufficient to disengage the interposed relationship of said forward portion and said interlock abutment, a selective door closing means comprising a selective closing abutment; means connecting said selective door closing abutment to said contact operating mechanism, and a selective door closing projection extending from said operating lever, said selective door closing abutment having a first position and a second position corresponding to said contact pairs ON and OFF position respectively, said selective door closing projection movable between a first position and a second position corresponding to said handle ON and OFF position respectively, said selective abutment in its first position blocking the movement of said selective projection from its first to its second position, thereby preventing said cover from being closed while said contact pairs are in the ON position and said handle is in the OFF position.

9. A panelboard unit comprising a box having a housing and a removable cover thereof, said cover having an outer surface and an inner surface, means mounting a handle to said outer surface, means mounting a handle operating mechanism to said inner surface, said handle operating mechanism containing a rigid integrally formed operating lever and a spring biased interlock defeater member, means connecting said operating lever to said handle to rotatably position said operating lever responsive to said handle being rotated to an ON and an OFF position, said handle operating mechanism containing means including said interlock defeater member to limit the extent of the rotatable motion of said operating lever to within a predetermined arcuate path length, said housing containing a plurality of electrical contact pairs, a contact operating mechanism and a stationary, rigid, door interlock abutment, said contact pairs having an ON and an OFF position, means connecting said contact operating mechanism to said contact pairs for switching said contact pairs to said positions, means connecting said contact operating mechanism to a forward vertical projection of said operating lever whereby movement of said handle to its ON or OFF position will effect corresponding movement between said contact ON and OFF positions, said operating lever containing a forward horizontal portion, said forward vertical projection and said horizontal portion being joined by a right angle bend, said interlock abutment being located between said forward horizontal portion and said cover when said contacts are in the ON position, said forward horizontal portion being maintained below said interlock abutment by said means to limit the extent of the rotatable motion of said operating lever, said last mentioned means including said interlock defeater member, said interlock defeater member being externally accessible via a defeater slot in said cover, said interlock defeater member being movable to allow extended arcuate movement of said operating lever upon the insertion of a tool in said slot, said extended arcuate movement being of a sufficient extent to disengage the interposed relationship of said forward portion and said interlock abutment, a selective door closing means comprising a selective door closing abutment; means connecting said selective door closing abutment to said contact operating mechanism, and a selective door closing projection consisting of said forward vertical projection, said selective door closing abutment having a first position and a second position corresponding to said contact pairs ON and OFF position respectively, said selective door closing projection movable between a first position and a second position corresponding to said handle ON and OFF position respectively, said selective abutment in its first position blocking the movement of said selective projection from its first to its second position, thereby preventing said cover from being closed while said contact pairs are in the ON position and said handle is in the OFF position.

10. A panelboard unit comprising a box having a housing and a removable cover thereof, said cover having an outer surface and an inner surface, means mounting a handle to said outer surface, means mounting a handle operating mechanism to said inner surface, said handle operating mechanism containing an integrally formed operating lever; means connecting said operating lever to said handle to rotatably position said operating lever responsive to said handle being rotated to an ON and OFF position, said handle operating mechanism containing means to limit the extent of the rotatable motion of said operating lever to within a predetermined arcuate path length between said ON and OFF position; said housing containing a plurality of electrical contact pairs, a contact operating mechanism and a spring biased interlock abutment member, said contact pairs having an ON and OFF position, means connecting said contact operating mechanism to said contact pairs for switching said switch contact pairs to said positions, means connecting said contact operating mechanism to said operating lever whereby movement of said handle to its ON or OFF position will effect corresponding movement between said contact ON and OFF position, said operating lever containing a forward portion, said interlock abutment member being located between said forward portion and said cover when said contacts are in the ON position, said forward portion being maintained below said interlock abutment member whereby said cover is prevented from being removed, means connecting said interlock abutment to an externally accessible defeater slot whereby the insertion of a tool in said slot will effect the removal of said abutment member from its interposed position, a selective door closing means comprising a selective door closing abutment; means connecting said selective door closing abutment to said contact operating mechanism, and a selective door closing projection comprised of said forward portion of said operating lever, said selective door closing abutment having a first position and a second position corresponding to said contact pairs ON and OFF position respectively, said selective door closing projection movable between a first position and a second position corresponding to said handle ON and OFF position respectively, said selective abutment in its first position blocking the movement of said selective projection from its first to its second position, thereby preventing said cover from being closed while said contact pairs are in the ON position and said handle is in the OFF position.

11. A panelboard unit comprising a box having a housing and a removable cover thereof, said cover having an outer surface and an inner surface, means mounting a handle to said outer surface, means mounting a handle operating mechanism to said inner surface, said handle operating mechanism containing an integrally formed operating lever means connecting said operating lever to said handle to rotatably position said operating lever responsive to said handle being rotated to an ON and OFF position, said handle operating mechanism containing means to limit the extent of the rotatable motion of said operating lever to within a predetermined arcuate path length between said ON and OFF position, said housing containing a plurality of electrical contact pairs, a contact operating mechanism and a spring biased interlock abutment member, said contact pairs having an ON and OFF position, means connecting said contact operating mechanism to said contact pairs for switching said contact pairs to said positions, means connecting said contact operating mechanism to said operating lever whereby movement of said handle to its ON or OFF position will effect corresponding movement between said contact ON and OFF position, said operating lever containing a forward portion, said interlock abutment member being located between said forward portion and said cover when said contacts are in the ON position, said forward portion being maintained below said interlock abutment member whereby said cover is prevented from being removed, means connecting said interlock abutment member to an interlock defeater member, said defeater member being externally accessible via a defeater slot in said cover whereby the insertion of a tool in said slot will effect the removal of said abutment member from its interposed position, a selective door closing means comprising a selective door closing abutment, means connecting said selective door closing abutment to said contact operating mechanism, and a selective door closing projection comprised of said forward portion of said operating lever, said selective door closing abutment having a first position and a second position corresponding to said contact pairs ON and OFF position respectively, said selective door closing projection movable between a first position and a second position corresponding to said handle ON and OFF position respectively, said selective abutment in its first position blocking the movement of said selective projection from its first to its second position, thereby preventing said cover from being closed while said contact pairs are in the ON position and said handle is in the OFF position.

12. A panelboard unit comprising a box having a housing and a removable cover thereof, said cover having an outer surface and an inner surface, means mounting a handle to said outer surface, means mounting a handle operating mechanism to said inner surface, said handle operating mechanism containing an integrally formed operating lever; means connecting said operating lever to said handle to rotatably position said operating lever responsive to said handle being rotated to an ON and OFF position, said handle operating mechanism containing means to limit the extent of the rotatable motion of said operating lever to within a predetermined arcuate path length between said ON and OFF position, said housing containing a plurality of electrical contact pairs, a contact operating mechanism and a spring biased interlock abutment member, said contact pairs having an ON and OFF position, means connecting said contact operating mechanism to said contact pairs for switching said contact pairs to said positions, means connecting said contact operating mechanism to said operating lever whereby movement of said handle to its ON or OFF position will effect corresponding movement between said contact ON and OFF position, said operating lever containing a forward portion, said interlock abutment member being located between said forward portion and said cover when said contacts are in the ON position, said forward portion being maintained below said interlock abutment member whereby said cover is prevented from being removed, means connecting said interlock abutment member to an interlock defeater member, said defeater member being externally accessible via a defeater slot in said cover whereby the insertion of a tool in said slot will effect the removal of said abutment from its interposed position, a selective door closing means comprising a selective door closing abutment; means connecting said selective door closing abutment to said contact operating mechanism, and a selective door closing projection comprised of said forward portion of said operating lever, said selective door closing abutment having a first position and a second position corresponding to said contact pairs ON and OFF position respectively, said selective door closing projection movable between a first position and a second position corresponding to said handle ON and OFF position respectively, said selective abutment in its first position blocking the movement of said selective projection from its first to its second position, thereby preventing said cover from being closed while said contact pairs are in the ON position and said handle is in the OFF position, said abutment member having a beveled surface, said beveled surface being positioned toward said operating lever when said cover is closed while said contacts are in the ON position, said operating lever and said beveled surface contacting to effect movement of said abutment member sufficient to permit said cover to be closed.

13. A panelboard unit comprising a box containing a first and a second sub-unit each having a housing and a removable cover thereof, each of said covers having an outer surface and an inner surface, means mounting a handle to said outer surface, means mounting a handle operating mechanism to said inner surface, each of said handle operating mechanisms containing an integrally formed operating lever; means connecting said operating lever to said handle to rotatably position said operating lever responsive to its handle being rotated to and ON and OFF position, each of said handle operating mechanisms containing means to limit the extent of the rotatable motion of its operating lever to within a predetermined arcuate path length between said ON and OFF position, each of said housings containing a plurality of electrical contact pairs, a contact operating mechanism and a spring biased interlock abutment member, said contact pairs having an ON and OFF position, means connecting said contact operating mechanism to said contact pairs for switching said contact pairs to said positions, means connecting each of said contact operating mechanisms to one of said operating levers whereby movement of said first sub-unit handle to its ON or OFF position will effect corresponding movement between said first sub-units contact ON and OFF position, each of said operating levers containing a forward portion, said first sub-unit interlock abutment member being located between said forward portion and said cover when said contacts are in the ON position, said forward portion being maintained below said interlock abutment member whereby said first sub-unit cover is prevented from being removed, means connecting each of said interlock abutment members to an externally accessible defeater slot whereby the insertion of a tool in said slot will effect the simultaneous removal of both of said abutment members from their interposed position, an individual selective door closing means for each of said sub-units comprising a selective door closing abutment; means connecting said selective door closing abutment to said sub-units contact operating mechanism, and a selective door closing projection comprised of said forward portion of the operating lever of said sub-units, said selective door closing abutments having a first position and a second position corresponding to said contact pairs ON and OFF positions respectively, said selective door closing projection movable between a first position and a second position corresponding to said handle ON and OFF positions respectively, said selective abutment in its first position blocking the movement of said selective projection from its first to its second position, thereby preventing said cover from being closed while said contact pairs are in the ON position and said sub-units handle is in the OFF position.

References Cited by the Examiner
UNITED STATES PATENTS 2,674,666  4/54  Stieglitz _______________ 200—50

KATHLEEN H. CLAFFY, *Primary Examiner.*

BERNARD A. GILHEANY, *Examiner.*